United States Patent
Liebenow

(10) Patent No.: US 6,522,640 B2
(45) Date of Patent: *Feb. 18, 2003

(54) DISTRIBUTED MODEM FOR NON-CELLULAR CORDLESS/WIRELESS DATA COMMUNICATION FOR PORTABLE COMPUTERS

(75) Inventor: Frank W. Liebenow, Dakota Dunes, SD (US)

(73) Assignee: Gateway, Inc., Poway, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,648

(22) Filed: Jan. 28, 1998

(65) Prior Publication Data

US 2002/0001289 A1 Jan. 3, 2002

(51) Int. Cl.$^7$ .................................................. H04J 3/12
(52) U.S. Cl. ...................................................... 370/338
(58) Field of Search ................................ 370/324, 347, 370/242, 248, 395, 330–338; 455/557, 445, 577; 375/222

(56) References Cited

U.S. PATENT DOCUMENTS

| | | | |
|---|---|---|---|
| 4,697,281 A | 9/1987 | O'sullivan | 379/59 |
| 4,884,269 A | 11/1989 | Duncanson et al. | 370/110.1 |
| 4,958,369 A | 9/1990 | Tsuchida | 379/156 |
| 4,972,457 A | 11/1990 | O'sullivan | 379/59 |
| 4,991,197 A | 2/1991 | Morris | 379/58 |
| 5,067,125 A | 11/1991 | Tsuchida | 379/79 |
| 5,113,396 A | 5/1992 | Kagami | 370/110.2 |
| 5,142,568 A | 8/1992 | Ogata et al. | 379/100 |
| 5,244,402 A | 9/1993 | Pasterchick, Jr. et al. | 439/217 |
| 5,255,317 A | 10/1993 | Arai et al. | 379/399 |
| 5,305,312 A | 4/1994 | Fornek et al. | 370/62 |
| 5,305,377 A | 4/1994 | D'Arcy et al. | 379/399 |
| 5,337,346 A | 8/1994 | Uchikura | 379/58 |
| 5,396,536 A | 3/1995 | Yudlowsky | 379/52 |
| 5,396,541 A | 3/1995 | Farwell et al. | 379/60 |
| 5,408,520 A | 4/1995 | Clark et al. | 379/93 |

(List continued on next page.)

OTHER PUBLICATIONS

IBM Announcement Letters, http://www1.ibmlink.ibm.com/cgi–bi 1 page (1995).

"AIRplex cordless modems are:", http://kiwi.futuris.net/kme/airplex.1.htm, AIRplex product information from K and M Electronics, Inc. 1 page (1995).

"IBM's Waverunner Nominated for Networking Industry Awards ISDN Product of the Year", *M2 Presswire*, M2 Communications, pp. 2–4, (Jul. 7, 1995).

"Integrated Services Digital Network (ISDN) Basic Access Interface for Use on Metallic Loops for Application on the Network Side of the NT", American National Standard for Telecommunications T1.601–1992, Cover page, pp. 49–50 (Feb. 21, 1992).

(List continued on next page.)

*Primary Examiner*—Kwang Bin Yao
*Assistant Examiner*—Prenell Jones
(74) *Attorney, Agent, or Firm*—Bradley A Forrest; Scott Charles Richardson; Schwegman, Lundberg, Woessner & Kluth

(57) ABSTRACT

A distributed modem in order to achieve non-cellular cordless/wireless data communications for portable computers is provided. In one embodiment, the modem includes three components, a digital signal processor (DSP), a coder/decoder (CODEC), and a digital-access arrangement (DAA). The DSP resides within a PCMCIA card for insertion into a computer. The CODEC and the DAA reside on a base station. The PCMCIA card and the base station communicate with one another via two transceivers, one each at the PCMCIA card and the base station.

22 Claims, 4 Drawing Sheets

U.S. PATENT DOCUMENTS

| | | | |
|---|---|---|---|
| 5,425,031 A | 6/1995 | Otsuka | 370/95.1 |
| 5,428,668 A | 6/1995 | Dent et al. | 379/59 |
| 5,428,671 A | 6/1995 | Dykes et al. | 379/93 |
| 5,448,635 A | 9/1995 | Biehl et al. | 379/399 |
| 5,452,289 A | 9/1995 | Sharma et al. | 370/32.1 |
| 5,459,788 A | 10/1995 | Kim | 379/399 |
| 5,473,638 A | 12/1995 | Marchetto et al. | 375/356 |
| 5,487,175 A | 1/1996 | Bayley et al. | 455/54.2 |
| 5,513,248 A | 4/1996 | Evans et al. | 379/61 |
| 5,517,553 A | 5/1996 | Sato | 379/59 |
| 5,528,593 A | 6/1996 | English et al. | 370/84 |
| 5,559,860 A | 9/1996 | Mizikovsky | 379/58 |
| 5,574,725 A | 11/1996 | Sharma et al. | 370/79 |
| 5,574,773 A | 11/1996 | Grob et al. | 379/59 |
| 5,606,594 A | 2/1997 | Register et al. | 379/58 |
| 5,633,920 A | 5/1997 | Kikinis et al. | 379/130 |
| 5,675,524 A | 10/1997 | Bernard | 365/705.05 |
| 5,715,238 A * | 2/1998 | Hall, Jr. et al. | 370/242 |
| 5,715,241 A | 2/1998 | Glass, III et al. | 370/252 |
| 5,787,360 A | 7/1998 | Johnston et al. | 455/524 |
| 5,802,476 A | 9/1998 | Nakajima et al. | 455/462 |
| 5,812,951 A * | 9/1998 | Ganesan et al. | 465/445 |
| 5,857,157 A | 1/1999 | Shindo | 455/550 |
| 5,864,758 A * | 1/1999 | Moon | 455/557 |
| 5,884,190 A * | 3/1999 | Lintula et al. | 455/557 |
| 5,905,873 A | 5/1999 | Hartmann et al. | 395/200.79 |
| 5,930,719 A * | 7/1999 | Babitch et al. | 455/557 |
| 5,953,674 A * | 9/1999 | Hutchison, IV | 455/55 |

OTHER PUBLICATIONS

"Introducing AIRplex", http://kiwi.futuris.net/kme/, Product information from K and M Electronics, Inc., 1 page, (1995).

"Kiss Cables Good–bye", http://www.portablecomputing.com/premier/162 htm, Product review of IBM cordless modem, 2 pages, (Apr. 8, 1997).

"TMS320C3x", Texas Instruments User's Guide for Digital Signal Processing Product No. TMS320C3x, Revision J, Cover page, Title page, and pp. 1–1 through 1–10 (Oct. 1994).

"WaveRunner Digital Modems", http://www.pc.ibm.com/options/g2214076,html#dagtb, pp. 1–8 (1994).

Bryce, J.Y., "Using ISDN", Published by Que Corporation, Cover page, Title page and Table of Contents (xvii–xxv) (1995).

Pargh, A., http://www.gadgetguru.com/aol/reviews/152.shtml, Product review of IBM cordless modem, 2 pages, (1997).

Pearlstein, J., "Farallon Introduces Netopia ISDN Modem", *MacWEEK*, vol. 10, No. 2, 1 page, (Jan. 15, 1996).

Pearlstein, J., "ISU Express adds POTS to ISDN", *MacWEEK*, vol. 9, No. 41, 2 pages, (Oct. 16, 1995).

Tam, T., "Exploiting ISDN Services to the Fullest", *PC Week*, vol. 12, No. 3, 3 pages, (Jan. 23, 1995).

"AT&T V.32bis/V.32/FAX High–Speed Data Pump Chip Sets Data Book", Published by AT&T Micorelectronics, pp. 1–91, F1–F15, B1–B14 and FB1–FB20 (Dec. 1991).

* cited by examiner

DISTRIBUTED MODEM FOR NON-CELLULAR CORDLESS/WIRELESS DATA COMMUNICATION FOR PORTABLE COMPUTERS

FIELD OF THE INVENTION

The present invention relates generally to cordless and wireless data communication for portable computers, and more specifically to such communication that is non-cellular in nature and accomplished via a distributed modem.

BACKGROUND OF THE INVENTION

Mobile computing has become increasingly important. Many computer users even use their portable computers (i.e., laptop and notebook computers) not only as their main computer, but as their only computer. Portable computers are now available with features that previously were found on only desktop computers, such as compact-disc read-only-memory (CD-ROM) drives, high-resolution color display screens, internal modems, expansion capability (in form of PC Card/PCMCIA Card slots), and in a few instances, integrated printers. With the advent of long-lasting batteries, the portable computer user with few exceptions is completely cordless in using the computer. Nearly everything the user needs is integrated within the portable computer itself.

The significant exception to maintaining a cordless working environment is the necessity of still being tethered by a phone cord when using a modem. While an internal battery frees the computer user from having to plug the computer into a power outlet, an internal modem still forces the computer user to plug the computer into a phone jack in order to communicate. Because computer communications are increasingly important, for example, to stay current through electronic mail and to remain hooked into a company computer network, the inability to remain completely cordless when using a modem with a portable computer is a serious inconvenience.

A limited solution is to attach a cellular phone to the modem. By attaching a cellular phone, the computer user remains completely mobile even when downloading electronic mail or hooking into a network. However, using a cellular phone is disadvantageous in that it is very expensive. Another limited solution is to frequency modulate the audio signal of the internal modem for wireless transmission to a base station; this solution, however, does not provide the user immunity to inevitable drop-outs of the modulated signal that may occur. Because the audio signal emanating from the internal modem is an analog signal—not a digital signal—no error correction can be built into the signal to protect against drop-outs.

Still another limited solution is to transmit serial data wirelessly between the portable computer and a base station in which a complete modem is provided, as is described in U.S. patent application Ser. No. 08/903,070, filed on Jul. 30, 1997, and entitled "Non-Cellular Cordless/non-wireless Data and Voice Communication for Portable Computers." A disadvantage to this solution, however, is that should the user also desire to have non-cordless/non-wireless modem communication, a complete modem is required to be installed into the portable computer as well as into the base station. This is costly and may be cost-prohibitive, because the user is required to purchase two complete modems: one in the base station for wireless communications, and one in the modem for non-wireless communications. For example, a business person traveling with a laptop computer may require a wireless modem when in an airport, and a wired modem when in a hotel.

Therefore, there is a need for a portable computer to remain completely cordless even when using a modem that overcomes the above-described shortcomings and problems. Such a solution should permit a computer user to connect to the Internet, access a company network, download electronic mail, etc., all without being tethered to a phone cord attached to a phone jack. Such a solution should not be cost prohibitive to the computer user, in the way that a cellular phone attached to a computer modem is, or in the way that a complete modem being required in both a computer and a base station is. Such a solution should also protect against inevitable drop-outs of the wireless signal, in the way that modulation of the audio signal of a modem installed on a computer does not.

SUMMARY OF THE INVENTION

The above-mentioned shortcomings are addressed by the present invention, which will be understood by reading and studying the following specification. The present invention describes a distributed modem for non-cellular cordless/wireless data communication for portable computers. The modem is distributed among a computer and a base station. In one embodiment, the digital signal processor (DSP) of a modem resides within a PC Card/PCMCIA card for insertion into the computer, while the coder/decoder (CODEC) and data-access arrangement (DAA) of the modem reside within a base station. Radio frequency (RF) transceivers at both the PC Card/PCMCIA card and the base station permit the DSP to wirelessly communicate with the CODEC. Preferably, the DAA attaches to a telephone plug for coupling to a telephone jack of a standard plain-old-telephone service (POTS). The invention, however, is not limited to application in conjunction with a PC Card; it may also be applied to an internal modem, for example.

In the case where the portable computer is running off a battery and therefore is otherwise untethered by cables or wires, the invention provides for completely cordless and cost-effective communication over a modem. The DSP of the modem residing within the PC Card/PCMCIA card inserted into the computer communicates with the CODEC and DAA of the modem at the base station wirelessly via the RF transceivers. Therefore, the computer remains completely cordless. However, because the DAA is still preferably connected to a POTS line through a telephone jack, the cost advantage of connecting through the POTS instead of a cellular network is maintained. The invention eliminates the physical connection between the DSP of the modem and the CODEC of the modem, but maintains the physical connection between the CODEC and DAA of the modem and the phone jack. That is, the invention provides for wireless communications.

Furthermore, to also provide for non-cordless/non-wireless communications without duplicating an entire modem, only the part of the modem distributed to the base station requires duplication at the computer. For example, a PC Card/PCMCIA card according to the invention need only also include a CODEC and a DAA to permit wired communications in addition to wireless communications. While this results in a complete modem at the computer, the base station still does not have a complete modem (viz., the DSP is missing), providing the invention with a cost advantage. Finally, because the signal from the DSP is being transmitted wirelessly in one embodiment, and this signal is a digital signal, error correction can be provided so that inevitable drop-outs of the wireless signal do not occur.

In different embodiments of the invention, computerized systems and hardware cards (such as PC Cards/PCMCIA Cards) of varying scope are described. Still other and further aspects, advantages and embodiments of the present invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
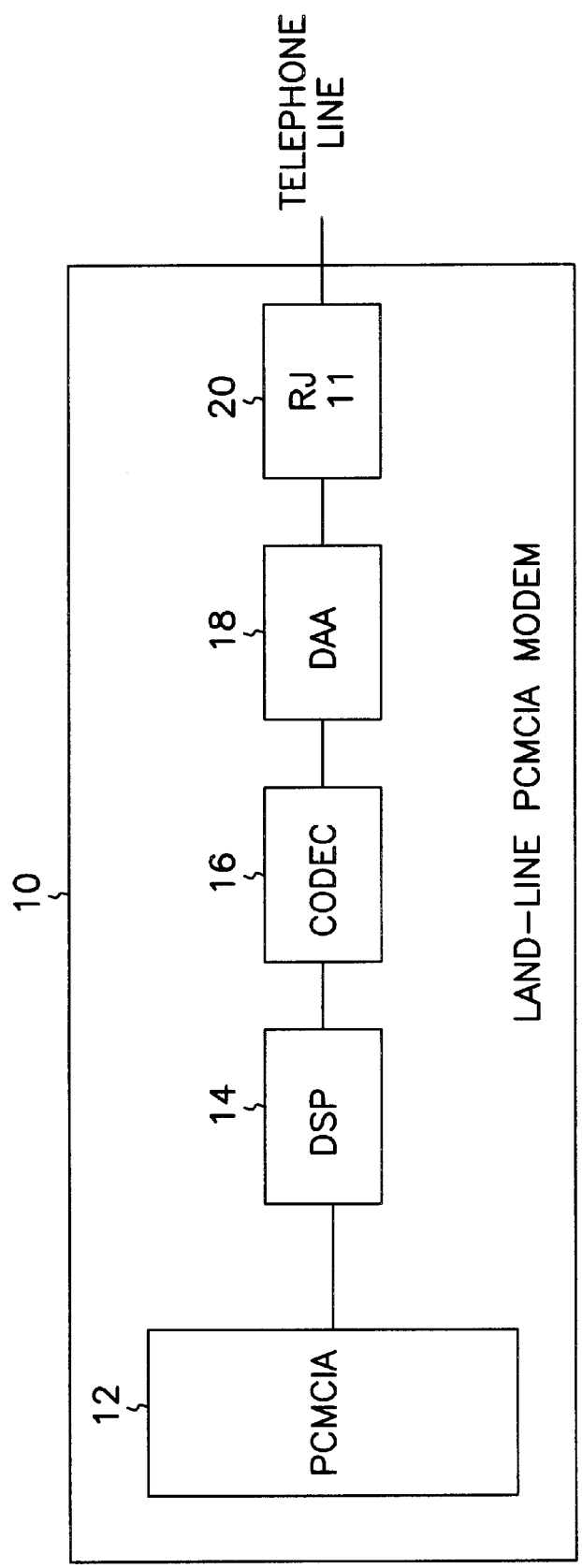
FIG. 1 is a diagram of a prior art land-line PCMCIA Card modem.

Referring first to FIG. 1, a simplified block diagram of a prior art land-line PCMCIA Card modem is shown. Modem 10 permits a computer (not shown) to communicate over an existing telecommunications system, such as a plain-old-telephone system (POTS). Digital signals sent by the computer are translated by the modem in a proper manner so that they may be sent over an existing telecommunications system. Furthermore, signals received over the existing telecommunications system are also translated by the modem in a proper manner for receipt by the computer. Modem technology, including digital signal processors (DSPs), coder/decoders (CODECs), and data-access arrangements (DAAs), is well known in the art. U.S. Pat No. 5,452,289, entitled "Computer-based multifunction personal communications system," which is hereby incorporated by reference, describes in detail the operation of such modem technology and modem-based computerized communications. The diagram of FIG. 1 is simplified to show only the basic architecture of a modem.

Modem 10 includes card connector 12 and interface logic, the connector removably insertable into a corresponding card slot of a computer or other device. Such cards are known within the art, and include PCMCIA cards, ISA cards, PCI cards, etc.; the invention is not so limited. Through connector 12 the computer sends signals to and receives signals from modem 10. Digital signal processor (DSP) 14 and coder/decoder (CODEC) 16 perform functionality such as modulation, demodulation and echo cancellation to communicate over a POTS or other existing telecommunications system. DSP 14 and CODEC 16 also perform digital to analog (D/A) conversion, analog to digital (A/D) conversion, coding/decoding, and gain control. More specifically, DSP 14 and CODEC 16 provide digital-to-analog and analog-to-digital signal processing capability.

DSP 14 and CODEC 16 interface with digital-access arrangement (DAA) 18, which is the telephone interface of modem 10. DAA 18 permits the modem to connect to a preexisting telecommunications system such as a POTS. Specifically, DAA 18 coordinates among DSP 14 and CODEC 16. As shown in FIG. 1, DAA 18 connects to the POTS via telephone connector 20, which plugs into a telephone jack of a telephone line of a POTS (not shown). DSP 14, CODEC 16 and DAA 18 are commonly referred to in the art as a "modem chip set." Examples of such chip sets include the Rockwell chip set, as known within the art.

A detailed description of a DSP, CODEC, and a telephone interface (viz., a DAA) in direct connection and cooperation with one another is described in the publication entitled "AT&T V.32bis/V.32/FAX High-Speed Data Pump Chip Set Data Book" published by AT&T Microelectronics, December 1991, which is hereby incorporated by reference. The AT&T data pump chip set described in this reference comprises the core of an integrated, two-wire full duplex modem which is capable of operation over standard telephone lines or leased lines. The data pump chip set conforms to the telecommunications specifications in CCITT recommendations V.32bis, V.32, V.22bis, V.22, V.23, V.21 and is compatible with the Bell 212A and 103 modems. Speeds of 14,400, 9600, 4800, 2400, 1200, 600 and 300 bits per second are supported. This chip set consists of a ROM-coded DSP16A digital signal processor U37 (viz., a DSP), and interface chip (viz., a DAA) U34, and an AT&T T7525 linear CODEC U35 (viz., a CODEC).

Figure 2:
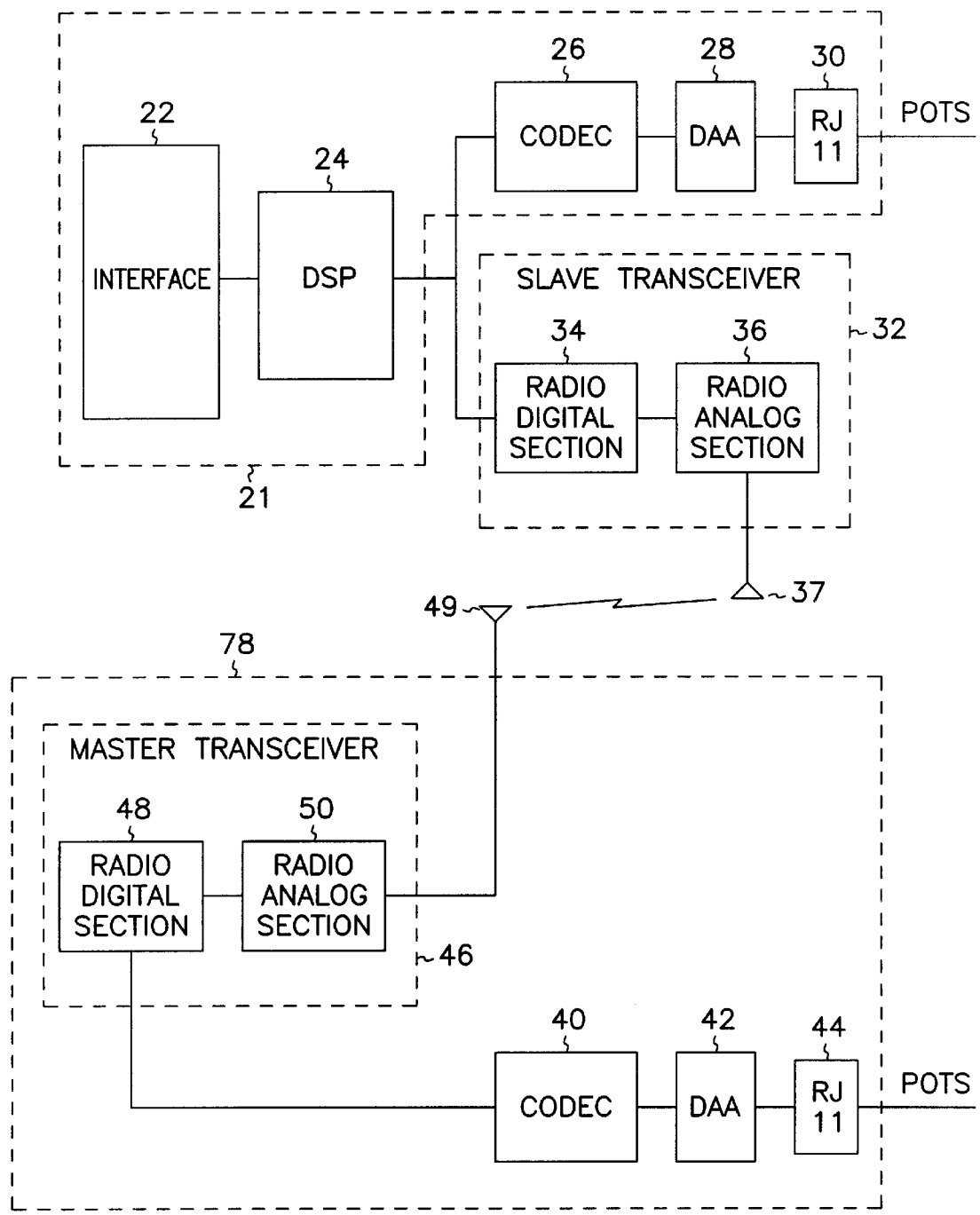
FIG. 2 is a diagram of a computerized wireless system configuration according to one embodiment of the invention.

Referring now to FIG. 2, a diagram of a computerized wireless system configuration according to one embodiment of the invention is shown. Modem 21, having card connector 22, DSP 24, CODEC 26, DAA 28 and telephone connector 30, plugs into a corresponding slot of a computer (not shown). In a land-line configuration in which a telephone connector 30 plugs into a telephone line, modem 21 functions as has been described in FIG. 1. That is, in a land-line configuration modem 21 operates in accordance with modem technology as is known in the prior art. Connector 22, DSP 24, CODEC 26, DAA 28, and telephone connector 30 correspond to their counterparts in the prior art as described in FIG. 1. The configuration shown is a preferred configuration in which the modem is a PCMCIA card modem (such as a Type III PCMCIA card) for connection to a POTS. The invention is not so limited, however. A modem integrated into a computer, is also within the scope of the invention.

As shown in FIG. 2, modem 21 is operatively coupled to transceiver 32. In an alternative embodiment, transceiver 32 is a physical part of modem 21. Transceiver 32 is coupled to modem 21 between DSP 24 and CODEC 26. Therefore, transceiver 32 sends in a wireless manner signals from DSP 24, and receives in a wireless manner signals for ultimate receipt by DSP 24. Transceiver 32 includes digital section 34 and analog section 36. Digital section 34 performs error-correction functionality to ensure that the wireless transmission and receipt of DSP signals will not be corrupted by drop-outs or other problems. Radio analog section 36 converts this digital signal to an analog signal for wireless transmission. Analog section 36 also receives analog signals sent wirelessly, and converts them to digital signals, which digital section 34 checks for errors that may have taken place during transmission. Transceiver 32 includes an antenna 37 to send and receive wireless radio frequency (RF) signals.

Base station 38 includes CODEC 40 and DAA 42. CODEC 40 and DAA 42 are identical to CODEC 26 and DAA 28. CODEC 40 and DAA 42 receive signals from DSP 24 in a wireless manner via the transceivers. CODEC 40 and DAA 42 communicate with a POTS via telephone connector 44, which is identical to telephone connector 30. Base station 38 includes transceiver 46 which corresponds to transceiver 32 coupled to modem 21. Transceiver 46 includes digital section 48, corresponding to digital section 32, and analog section 50, which corresponds to analog section 36. Digital signals sent by CODEC 40 for transmission to DSP 24 are embedded with error-correction data by digital section 48 and converted to analog by analog section 50. Similarly, signals sent by DSP 24 wirelessly are received in an analog fashion by section 50 and converted to digital signals, which digital section 48 checks for errors. Transceiver 46 includes an antenna 49 to send and receive wireless radio frequency (RF) signals. (I.e., antennas 37 and 49 are communicatively coupled to one another.) Base station 38 is preferably powered by a small plug-in AC adapter not shown in FIG. 2.

The embodiment of the invention shown in FIG. 2 operates as follows. In a wireless mode, data is sent by the computer through card 22 to DSP 24. DSP 24 performs functionality identical to that as has been described in conjunction with the DSP of the prior art modem of FIG. 1. As known within the art, typically DSP 24 sends digitally encoded audio at a rate of sixty-four kilobits per second. This digitally encoded audio is sent to transceiver 32. Digital section 34 of transceiver 32 adds appropriate error-correction coding to compensate for any drop-outs or noise encountered in the wireless transmission of the digitally encoded audio. Analog section 36 converts the digital encoded audio to an analog signal, and the signal is sent wirelessly to transceiver 46 via antennas at each of transceivers 32 and 46.

Analog section 50 of transceiver 46 of base station 38 receives the analog signal sent by section 36 of transceiver 32 and converts it to a digital signal. Digital section 46 receives this digital signal, and extracts the data sent by DSP 24. CODEC 40, DAA 42, and telephone connector 44 then perform functionality as has been described in conjunction with FIG. 1. The signal is sent from CODEC 40 and DAA 42 through telephone connector 44 to the POTS, where a modem also connected to the POTS ultimately receives the signal. In a wired mode, DSP 24 sends data to CODEC 26, DAA 28, and telephone connector 30 of modem 21, and these components perform functionality as on a prior art modem, as has been described in conjunction with FIG. 1. Furthermore, in the case where DSP 24 is receiving information from over the POTS (as opposed to sending information), the process just described operates in reverse.

In a preferred embodiment, the signals are sent at a radio frequency of 2.4 GHZ (viz., the transceivers are radio-frequency transceivers). This is preferable to other frequencies, such as 900 MHZ, because 2.4 GHz is unlicensed and available in most countries, is not as crowded as the 900 MHZ band, and electromagnetic interference generated by notebook computers does not interfere as much at 2.4 GHz as it does at 900 MHZ. However, 900 MHZ transceiver equipment is generally less expensive than 2.4 GHz transceiver equipment. The invention is not limited to any given frequency, however; other frequencies include 5.6 GHz.

Preferably the transmission protocol is a packet-based protocol, as such protocols are commonly known within the art. Data is sent between transceivers 32 and 46 in a packetized manner. For outgoing data, digital section 34 of transceiver 32 groups data sent by DSP 24 in packets, adding a header to the data that includes error-correction information. When digital section 48 of transceiver 46 receives the packet, it extracts the packetized data and checks the data for errors by comparing the data to the error-correction information within the header. After a packet of data has been sent, the two transceivers handshake, as that term is known within the art, with the receiving transceiver (e.g., transceiver 46) indicating to the sending transceiver (e.g., transceiver 32) whether the data was received correctly. If the packet was not received correctly, the packet is resent. If the packet was received correctly, the next packet of data is then sent. For incoming data, this process is reversed. To accommodate the packetizing of the data, and in order to provide a full-duplex connection and provide for retransmissions without slowing down throughput, a data rate of four times sixty-four kilobits per second between the transceivers is preferred (i.e., four times the data rate that DSP 24 pumps out data). The packetization of data permits easy insertion of error-correction capability. The invention is not limited to any particular packetization, error-correction and handshaking protocol. Such protocols are well known within the art, such as the X.25 protocol known within the art.

Furthermore, preferably the transmission protocol is a spread spectrum frequency hopper-based protocol. A master transceiver (designated as transceiver 46 of FIG. 2) scans 75 possible channels continuously until a slave transceiver (designated as transceiver 32 of FIG. 2) responds. After authorizing a unique security code, both the master and slave transceivers hop among the 75 channel pairs in a pseudo-random sequence known to both the master and the slave. Federal Communications Commission (FCC) requirements force hopping every fourth-tenths of a second or sooner. Preferably the hopping is accomplished every time a packet is sent, to coincide with the transceiver having to handshake after a packet is sent to ensure that it has been sent correctly.

As has been described, the present invention provides for a distributed modem to obtain non-cellular wireless data communications. The DSP, CODEC and DAA components of the prior art modem described in FIG. 1 are distributed among a modem and a base station as shown in the embodiment of the invention in FIG. 2. The DSP resides on the modem, while the CODEC and the DAA reside on the base station. In a preferred embodiment, the modem still includes a CODEC and a DAA to permit non-wireless communications as well, but this is not required to practice the invention. The invention provides non-cellular communications in that the DAA still connects to a telephone jack of a POTS system via a telephone connector—no cellular network is necessary. Furthermore, the invention provides a cost savings in providing both wired and wireless communications without requiring two complete modems. The DSP is not duplicated at the base station, but only resides within the modem.

Figure 3:
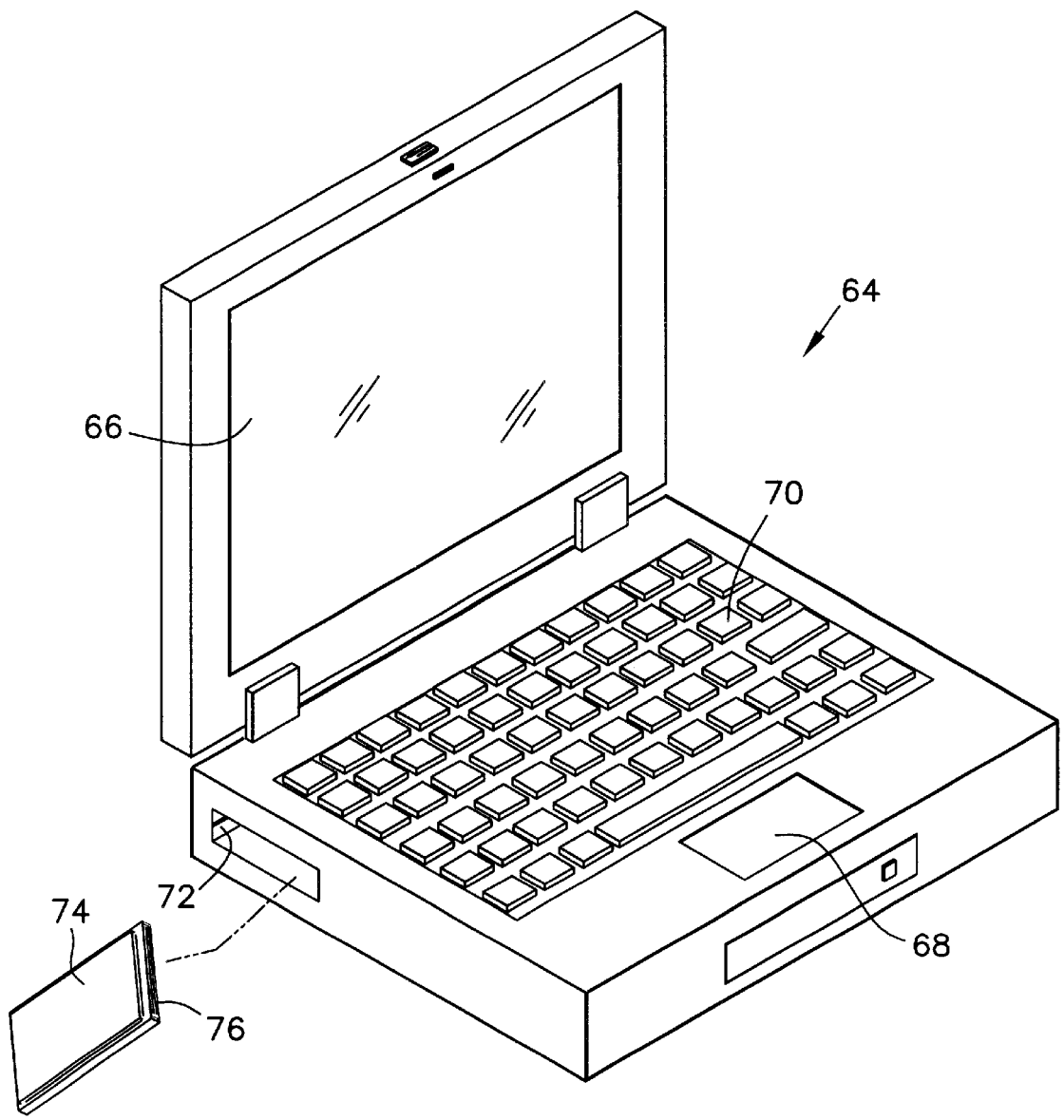
FIG. 3 is a diagram of a typical computer in conjunction with which an embodiment of the invention may be implemented; and, FIG. 4 is a diagram of a typical base station in conjunction with which an embodiment of the invention may be implemented.

Referring now to FIG. 3, a diagram of a typical computer in conjunction with which an embodiment of the invention may be implemented is shown. Computer 64 includes flat panel display 66, such as a liquid crystal display (LCD), pointing device 68, such as a touch pad pointing device, and keyboard 70. Not shown is that computer 64 also includes a processor (preferably, an Intel Pentium processor), random-access memory (RAM) (preferably, at least sixteen megabytes), read-only memory (ROM), and one or more storage devices, such as a hard disk drive, a floppy disk drive, a CD-ROM drive, or a tape cartridge drive. Preferably, computer 64 is running a version of the Microsoft Windows operating system, although the invention is not so limited.

Computer 64 also has one or more card slots 72, such as Type I, Type II, or Type III slots. For insertion into one of slots 72 is card 74 which has thereon connector 76, which plugs into a corresponding connector at the back of slot 72 (not shown). Card 74 is any type of card according to the present invention as has been described. In one embodiment, card 74 includes a transceiver to provide computer 64 with wireless communication capability. That is, via card 74 computer 64 communications with a base station (not shown) having a transceiver, a modem distributed over the card and the base station.

Figure 4:
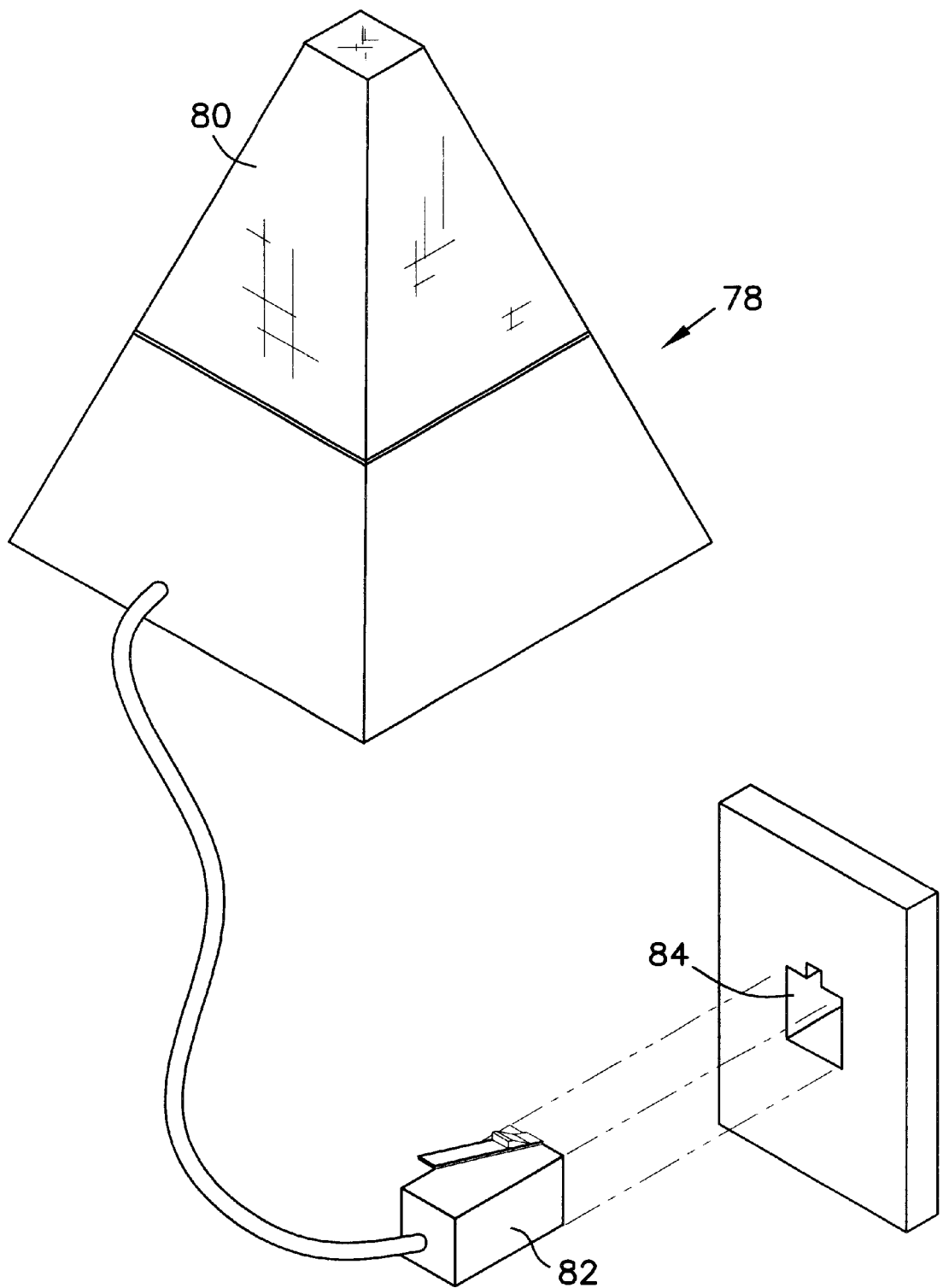

Referring now to FIG. 4, a diagram of a typical base station in conjunction with which an embodiment of the invention may be implemented is, shown. Base station 78 has transceiver 80 to communicate with the transceiver operatively coupled to a computer (e.g., such as the transceiver of card 74 of FIG. 3, as coupled to computer 64 of FIG. 3), according to the present invention as has been described. Base station 78 also includes a cable ending in a telephone plug 82, which plugs into a telephone jack of a wall plate 84 as is shown. The telephone jack is wired into a POTS system as is typically encountered in the United States. Base station 78 sends signals to and receives signals from the POTS as has been described.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the invention has been shown in relation to wireless transceivers communicating over radio frequencies. However, transceivers communicating using infrared signals are also within the scope of the invention. Therefore, it is manifestly intended that this invention be limited only by the following claims and equivalents thereof.

I claim:

1. A computerized system comprising:
   a computer including a first radio frequency (RF) receiver;
   a base station including a second radio frequency (RF) receiver communicatively corresponding to the first RF transceiver; and,
   a distributed modem capable of non-cellular cordless/wireless data communication for portable computers, the a modem distributed over the computer and the base station such that a first part of the modem resides within the computer and a second part of the modem resides within the base station,
   wherein the first part of the modem communicates with the second part of the modem via the first and the second RF receivers.

2. The computerized system of claim 1, wherein the first part of the modem includes a digital signal processor (DSP) adapted to modem communications.

3. The computerized system of claim 1, wherein the second part of the modem includes a coder/decoder (CODEC) and a digital-access arrangement (DAA), the CODEC and the DAA adapted to modem communications.

4. The computerized system of claim 1, wherein the first part of the modem is disposed on a hardware card removably insertable into a slot of the computer.

5. A computerized system comprising:
   a computer including a digital signal processor (DSP) adapted to modem communications including non-cellular cordless/wireless data communication for portable computers, and a first radio frequency (RF) transceiver operatively coupled to the DSP; and,
   a base station including a coder/decoder (CODEC) and a digital-access arrangement (DAA), the CODEC and the DAA adapted to modem communications corresponding with the DSP, the base station also including a second radio frequency (RF) transceiver operatively coupled to the CODEC and the DAA and communicatively corresponding to the first RF transceiver.

6. The computerized system of claim 5, wherein the computer further includes a slot, and the DSP and the first RF transceiver are disposed on a hardware card removably insertable into the slot.

7. The computerized system of claim 6, wherein the hardware card is a PCMCIA card and the slot is receptive to PCMCIA cards.

8. The computerized system of claim 5, wherein the base station further includes a telecommunications plug operatively coupled to the DAA for insertion into a telecommunications jack of an existing telecommunications network system.

9. The computerized system of claim 8, wherein the telecommunications plug is a telephone plug and the telecommunications jack is receptive to telephone plugs.

10. The computerized system of claim 8, wherein the existing telecommunications network system comprises comprising plain-old-telephone service (POTS).

11. The computerized system of claim 5, wherein the computer further includes a second coder/decoder (CODEC) and a second digital-access arrangement (DAA), the second CODEC and the second DAA adapted to modem communications corresponding with the DSP.

12. The computerized system of claim 11, wherein the computer further includes a telecommunications plug operatively coupled to the second DAA for insertion into a telecommunications jack of an existing telecommunications network system.

13. The computerized system of claim 5, wherein the first RF transceiver communicates with the second RF transceiver at a frequency selected from the group of frequencies comprising 900 MHZ, 5.6 GHz and 2.4 GHz.

14. A hardware card for removable insertion into a corresponding slot of a computer comprising:
    a first radio frequency (RF) transceiver;
    a first part of a modem operatively coupled to the first RF transceiver and corresponding to a second part of the modem residing within a base station,
    wherein the first part of the modem communicates with the second part of the modem via the first and the second RF receivers, said modem capable of non-cellular cordless/wireless data communication for portable computers.

15. The hardware card of claim 14, wherein the hardware card is a PCMCIA card and the slot is receptive to PCMCIA cards.

16. A hardware card for removable insertion into a corresponding slot of a computer comprising:
    a first radio frequency (RF) transceiver communicatively corresponding to a second radio frequency (RF) transceiver of a base station, the base station also including a coder/decoder (CODEC) and a digital-access arrangement (DAA) adapted to modem communications including non-cellular cordless/wireless data communication for portable computers; and,
    a digital signal processor (DSP) operatively coupled to the first RF transceiver and adapted to modem communications corresponding with the CODEC and the DAA.

17. The hardware card of claim 16, wherein the hardware card is a PCMCIA card and the slot is receptive to PCMCIA cards.

18. The hardware card of claim 16, further comprising:

a second coder/decoder (CODEC) operatively coupled to the DSP; and, a second digital-access arrangement (DAA), operatively coupled to the CODEC, the second CODEC and the second DAA adapted to modem communications corresponding with the DSP.

19. The hardware card of claim 18, further comprising a telecommunications plug operatively coupled to the second DAA for insertion into a telecommunications jack of an existing telecommunications network system.

20. The hardware card of claim 19, wherein the existing telecommunications network system comprises plain-old-telephone service (POTS).

21. A computerized system comprising:

a computer including a first radio frequency (RF) receiver;

a base station including a second radio frequency (RF) receiver communicatively corresponding to the first RF transceiver; and, a distributed modem capable of non-cellular cordless/wireless data communication for portable computers, the modem distributed over the computer and the base station such that a first part of the modem resides within the computer and a second part of the modem resides within the base station, the base station further including a telecommunications plug operatively coupled to the second part of the modem for insertion into a telecommunications jack of an existing telecommunications network system;

wherein the first part of the modem communicates with the second part of the modem via the first and the second RF receivers.

22. A hardware card for removable insertion into a corresponding slot of a computer comprising:

a first radio frequency (RF) transceiver;

a first part of a modem operatively coupled to the first RF transceiver and corresponding to a second part of the modem residing within a base station, the base station further including a telecommunications plug operatively coupled to the second part of the modem for insertion into a telecommunications jack of an existing telecommunications network system;

wherein the first part of the modem communicates with the second part of the modem via the first and the second RF receivers, said modem capable of non-cellular cordless/wireless data communication for portable computers.

* * * * *